United States Patent
Ikeura

(10) Patent No.: US 8,542,370 B2
(45) Date of Patent: Sep. 24, 2013

(54) IMAGE FORMING APPARATUS EXECUTING A PROCESS CORRESPONDING TO A FUNCTION INFORMATION ITEM INCLUDED IN AN APPLICATION INFORMATION ITEM SELECTED FROM A LIST, INFORMATION PROCESSING APPARATUS, INFORMATION PROCESSING METHOD, AND COMPUTER-READABLE RECORDING MEDIUM

(75) Inventor: Ryuichi Ikeura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 933 days.

(21) Appl. No.: 12/652,984

(22) Filed: Jan. 6, 2010

(65) Prior Publication Data

US 2010/0235772 A1 Sep. 16, 2010

(30) Foreign Application Priority Data

Mar. 10, 2009 (JP) .................. 2009-057010

(51) Int. Cl.
*G06F 3/12* (2006.01)
*H04N 1/40* (2006.01)

(52) U.S. Cl.
USPC ........................................ 358/1.13; 358/1.15

(58) Field of Classification Search
USPC ................ 358/1.1, 1.9, 1.13, 1.14, 1.15, 402, 358/468, 474
See application file for complete search history.

(56) References Cited

U.S. PATENT DOCUMENTS

| 8,201,077 B2 * | 6/2012 | Reddy et al. .................. 715/221 |
| 2007/0046996 A1 | 3/2007 | Matsuda |
| 2009/0046057 A1 * | 2/2009 | Umezawa ..................... 345/156 |
| 2009/0077164 A1 | 3/2009 | Phillips et al. |
| 2009/0077169 A1 | 3/2009 | Ikeura et al. |

FOREIGN PATENT DOCUMENTS

| CN | 1921547 A | 2/2007 |
| JP | 2004-234617 | 8/2004 |
| JP | 2007-286957 A | 11/2007 |
| JP | 2008-271520 A | 11/2008 |

OTHER PUBLICATIONS

Chinese Office Action issued Jun. 24, 2011, in Patent Application No. 201010129418.4 (with English-language translation).
Japanese Office Action Issued Feb. 12, 2013 in Patent Application No. 2009-057010.

* cited by examiner

*Primary Examiner* — Gabriel Garcia
(74) *Attorney, Agent, or Firm* — Oblon, Spivak, McClelland, Maier & Neustadt, L.L.P.

(57) ABSTRACT

An image forming apparatus including a receiving unit configured to receive an application information item that corresponds to an application or a job that is executed by the application, and to record the application information item in a storing unit, wherein the application information item includes a function identification item used for identifying a function for which an execution request is given to the image forming apparatus from the application included in an information processing apparatus connected to the image forming apparatus via a network; a display control unit configured to cause a display unit to display a list including the application information item that corresponds to the application or the job, based on the application information item recorded in the storing unit; and a function control unit configured to execute a process corresponding to the function identification item included the application information item that is selected from the list.

9 Claims, 18 Drawing Sheets

FIG.7

| APPLICATION ID | PRINT001 |
|---|---|
| USER ID | USER A |
| COORDINATION FUNCTION IDENTIFIER | PRINT |
| NETWORK APPLICATION ADDRESS | http://xxx/xxx/xxx |
| DISPLAY NAME | PRINT FILE A |
| PRINT SETTING INFORMATION | ... |
| FILE NAME | FILE A |
| FILE FORMAT | WORD |
| PDL LIST | ... |

FIG.11

| APPLICATION ID | SCAN001 |
|---|---|
| USER ID | USER A |
| COORDINATION FUNCTION IDENTIFIER | SCAN |
| NETWORK APPLICATION ADDRESS | http://xxx/xxx/yyy |
| DISPLAY NAME | SCAN APPLICATION |
| SCAN SETTING INFORMATION | ... |

FIG.14

| APPLICATION ID | PRINT001 |
|---|---|
| USER ID | USER A |
| COORDINATION FUNCTION IDENTIFIER | PRINT |
| NETWORK APPLICATION ADDRESS | http://xxx/xxx/xxx |
| DISPLAY NAME | PRINT FILE A |
| PRINT SETTING INFORMATION | ... |
| FILE NAME | FILE A |
| FILE FORMAT | WORD |
| PDL LIST | ... |
| NETWORK APPLICATION RELAY URL | http://xxxxxxxx |

FIG.15

| APPLICATION ID | SCAN001 |
|---|---|
| USER ID | USER A |
| COORDINATION FUNCTION IDENTIFIER | SCAN |
| NETWORK APPLICATION ADDRESS | http://xxx/xxx/yyy |
| DISPLAY NAME | SCAN APPLICATION |
| SCAN SETTING INFORMATION | ... |
| NETWORK APPLICATION RELAY URL | http://yyyyyyyyy |

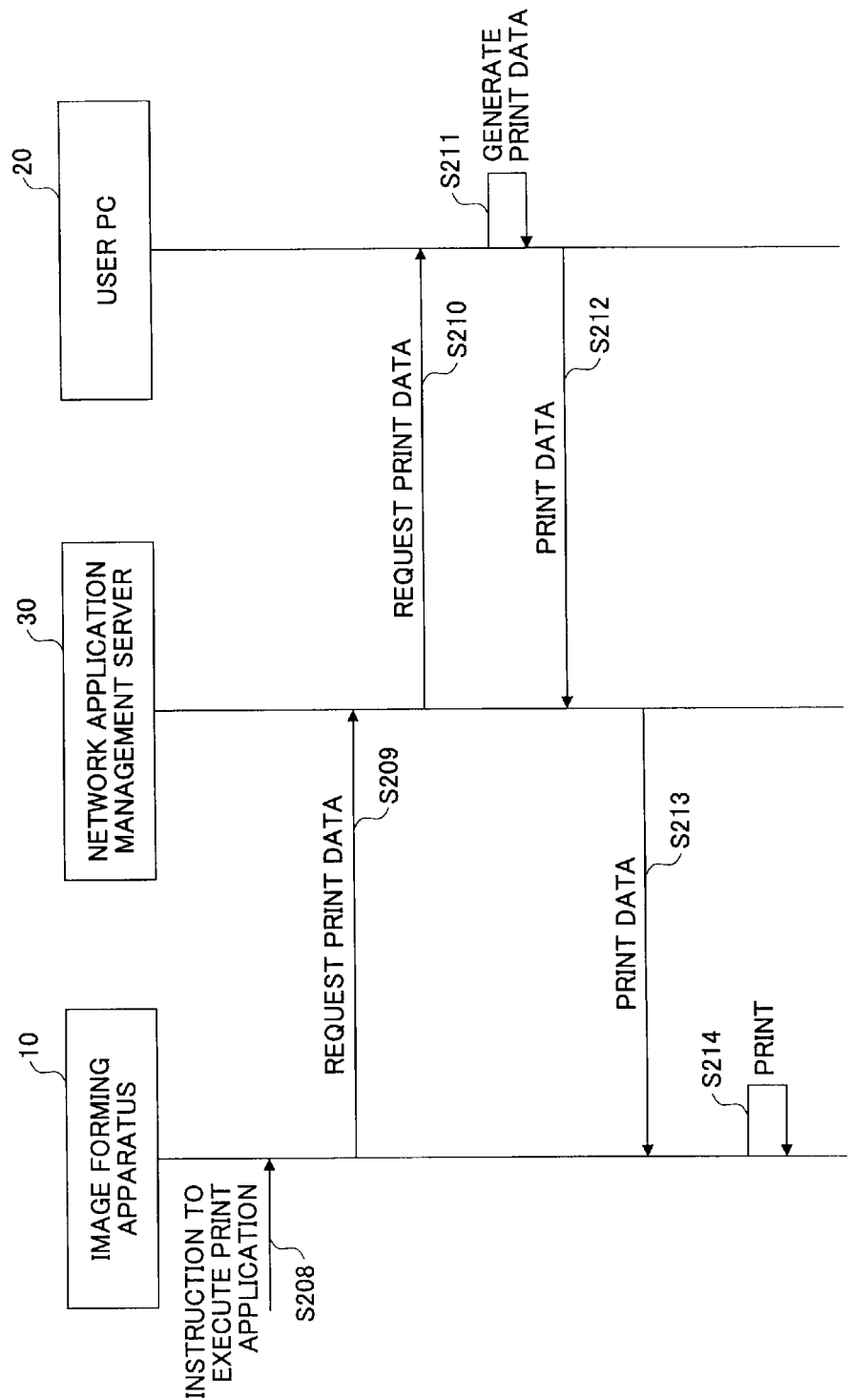

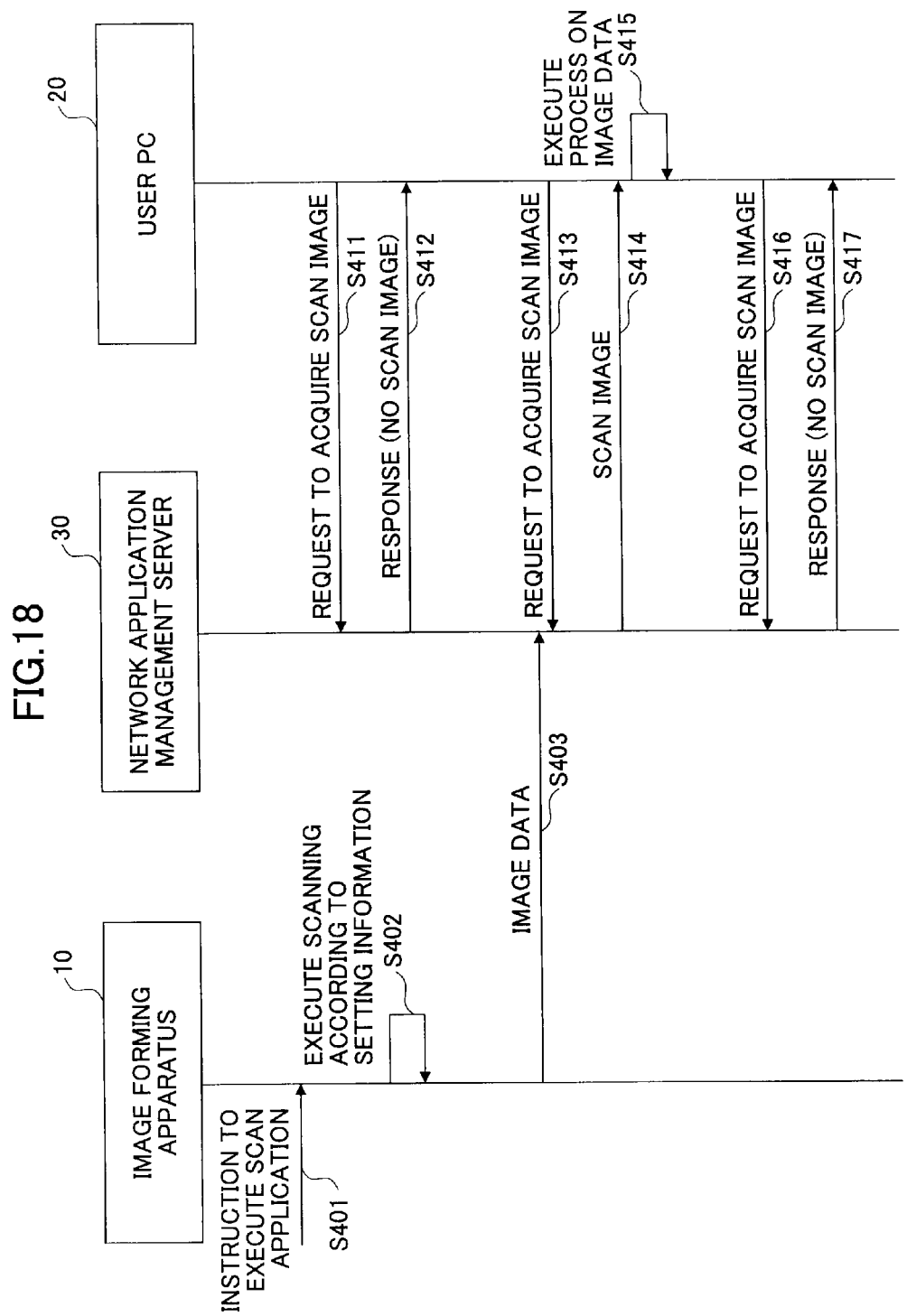

IMAGE FORMING APPARATUS EXECUTING A PROCESS CORRESPONDING TO A FUNCTION INFORMATION ITEM INCLUDED IN AN APPLICATION INFORMATION ITEM SELECTED FROM A LIST, INFORMATION PROCESSING APPARATUS, INFORMATION PROCESSING METHOD, AND COMPUTER-READABLE RECORDING MEDIUM

BACKGROUND OF THE INVENTION

1. Field of the Invention

The present invention relates to an image forming apparatus, an information processing apparatus, an information processing method, and a computer-readable recording medium.

2. Description of the Related Art

In recent years, office devices such as image forming apparatuses and fax machines have frequently been used in offices to improve the efficiency of business operations. When an office device is installed in an office, people working at the office can register information regarding their own PCs in the office device or make preferable settings regarding the functions to be used with the office device (customization), so that the efficiency of business operations is improved.

The above described settings can be made via an operations panel of the office device. However, it is time-consuming and difficult to operate an operations panel of an office device, compared to operating a PC. Furthermore, when plural office devices are to be used, the same operation needs to be repeated for all of the office devices.

Conventionally, a technology has been proposed to set setting data with a PC, and download the setting data into each office device (see, for example, patent document 1). With such a technology, settings for an office device can be made relatively easily with the use of a PC.

However, with the technology described in patent document 1, the downloaded setting data is commonly applied to all of the users using the office device. Thus, the users have no choice but to use the common settings. In order to make individual settings, the user has to use the operations panel of the office device every time he uses the office device.

Patent Document 1: Japanese Laid-Open Patent Application No. 2004-234617

SUMMARY OF THE INVENTION

The present invention provides an image forming apparatus, an information processing apparatus, an information processing method, and a computer-readable recording medium, in which one or more of the above-described disadvantages are eliminated.

A preferred embodiment of the present invention provides an image forming apparatus, an information processing apparatus, an information processing method, and a computer-readable recording medium capable of improving the operability regarding usage of functions.

According to an aspect of the present invention, there is provided an image forming apparatus including an application information receiving unit configured to receive an application information item that corresponds to an application or a job that is executed by the application, and to record the application information item in an application information storing unit, wherein the application information item includes a function identification information item used for identifying a function for which an execution request is given to the image forming apparatus from the application included in an information processing apparatus connected to the image forming apparatus via a network; a display control unit configured to cause a display unit to display an application information item list including the application information item that corresponds to the application or the job, based on the application information item recorded in the application information storing unit; and a function control unit configured to execute a process corresponding to the function identification information item included the application information item that is selected from the application information item list.

According to an aspect of the present invention, there is provided an information processing method performed by an image forming apparatus, including receiving an application information item that corresponds to an application or a job that is executed by the application, and recording the application information item in an application information storing unit, wherein the application information item includes a function identification information item used for identifying a function for which an execution request is given to the image forming apparatus from the application included in an information processing apparatus connected to the image forming apparatus via a network; causing a display unit to display an application information item list including the application information item that corresponds to the application or the job, based on the application information item recorded in the application information storing unit; and executing a process corresponding to the function identification information item included in the application information item that is selected from the application information item list.

According to an aspect of the present invention, there is provided a computer-readable recording medium recording a program that causes an image forming apparatus to execute a procedure including receiving an application information item that corresponds to an application or a job that is executed by the application, and recording the application information item in an application information storing unit, wherein the application information item includes a function identification information item used for identifying a function for which an execution request is given to the image forming apparatus from the application included in an information processing apparatus connected to the image forming apparatus via a network; causing a display unit to display an application information item list including the application information item that corresponds to the application or the job, based on the application information item recorded in the application information storing unit; and executing a process corresponding to the function identification information item included in the application information item that is selected from the application information item list.

According to one embodiment of the present invention, an image forming apparatus, an information processing apparatus, an information processing method, and a computer-readable recording medium are provided, which are capable of improving the operability of using a function.

BRIEF DESCRIPTION OF THE DRAWINGS

Other objects, features and advantages of the present invention will become more apparent from the following detailed description when read in conjunction with the accompanying drawings, in which:

FIG. 7 illustrates an example of application information of the print application;

FIG. 11 illustrates an example of application information of the scan application;

FIG. 14 illustrates a configuration of the application information of the print application sent from a network application management server to the image forming apparatus;

FIG. 15 illustrates a configuration of application information of the scan application sent from the network application management server to the image forming apparatus;

FIG. 17 is a sequence diagram for describing the process of the print application; and FIG. 18 is a sequence diagram for describing the process of the scan application.

DETAILED DESCRIPTION OF THE PREFERRED EMBODIMENTS

A description is given, with reference to the accompanying drawings, of embodiments of the present invention.

Figure 1:
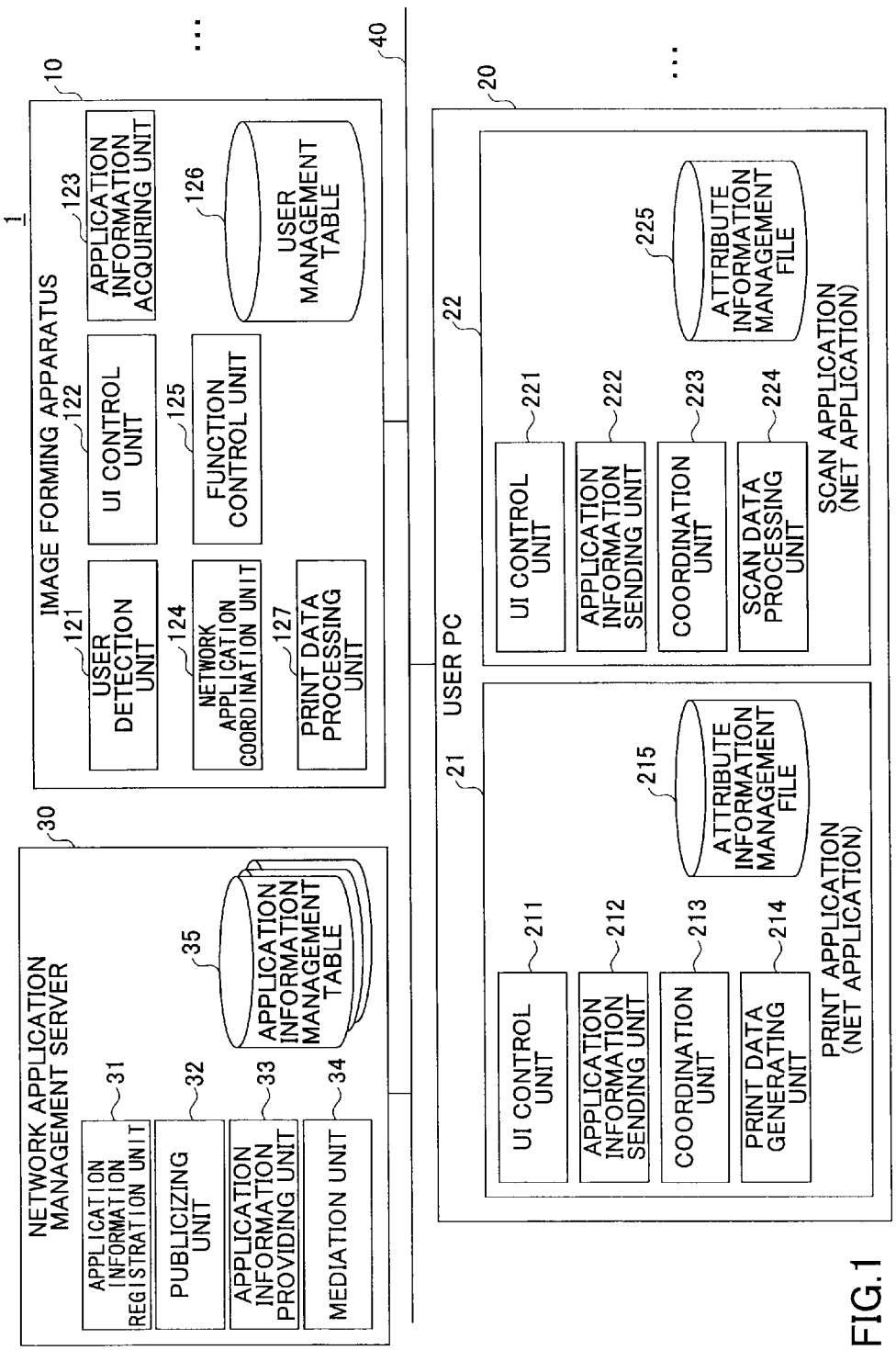
FIG. 1 illustrates a configuration of an information processing system according to an embodiment of the present invention.

FIG. 1 illustrates a configuration of an information processing system according to an embodiment of the present invention. An information processing system 1 shown in FIG. 1 includes at least one image forming apparatus 10, at least one user PC 20, and a network application management server 30, which are connected to each other by a network 40 (wired or wireless) such as a LAN (Local Area Network).

The user PC 20 is a PC (Personal Computer) allocated to each user, which includes applications (hereinafter, "network applications") for providing predetermined services in coordination with the image forming apparatus 10. In FIG. 1, a print application 21 and a scan application 22 are shown as examples of network applications. The print application 21 is a network application that causes the image forming apparatus 10 to execute a print job. The print application 21 can communicate with the image forming apparatus 10 via the network 40. The print application 21 includes a UI control unit 211, an application information sending unit 212, a coordination unit 213, a print data generating unit 214, and an attribute information management file 215.

The UI control unit 211 displays various display screen pages regarding the print application 21 on a display device of the user PC 20. In response to input of a print instruction, the application information sending unit 212 sends a request to register application information regarding the print application 21 to the network application management server 30. The application information includes information that is required for executing the print application 21. The application information of the print application 21 according to the present embodiment corresponds to a print request to the image forming apparatus 10. The coordination unit 213 controls communications (exchange of information, etc.) for coordinating with the image forming apparatus 10. The print data generating unit 214 generates print data (PDL (Page Description Language)) of a document file (electronic data) to be printed by the image forming apparatus 10, with the use of a printer driver installed in the user PC 20. The attribute information management file 215 is for storing attribute information of the print application 21. The attribute information includes, for example, an identifier (application ID) of the print application 21, a user ID of the user who owns the print application 21, and initial values of print setting information (information indicating printing conditions).

The scan application 22 is a network application for executing a predetermined process (for example, distributing or saving) on image data obtained by a scanning process of the image forming apparatus 10. The scan application 22 includes a UI control unit 221, an application information sending unit 222, a coordination unit 223, a scan data processing unit 224, and an attribute information management file 225.

The UI control unit 221 displays various display screen pages regarding the scan application 22 on a display device of the user PC 20. When the scan application 22 is activated, the application information sending unit 222 sends a request to register application information regarding the scan application 22 to the network application management server 30. The application information includes information that is required for executing the scan application 22. The coordination unit 223 controls communications (exchange of information, etc.) for coordinating with the image forming apparatus 10. The attribute information management file 225 is for storing setting information of the scan application 22. The scan data processing unit 224 executes a predetermined process (for example, distributing or saving) on image data that has been obtained by a scanning process of the image forming apparatus 10 and transferred to the user PC 20. The attribute information management file 225 is for storing attribute information of the scan application 22. The attribute information includes, for example, an identifier (application ID) of the scan application 22, a user ID of the user who owns the scan application 22, and initial values of scan setting information (information indicating scanning conditions).

The attribute information management file 215 of the print application 21 and the attribute information management file 225 of the scan application 22 store user IDs of owners of the respective network applications, which means that the network applications belong to corresponding users. Thus, network applications of the same type may be distinguished as different network applications if the network applications belong to different users. For example, when a network application belongs to user A, basically only user A is allowed to use this network application. When a network application belongs to user B, basically only user B is allowed to use this network application. However, when a usage right is given to another user by an access control function, the other user will be allowed to use a network application owned by someone else.

In FIG. 1, only one user PC 20 is shown; however, plural user PCs 20 may be connected to the network 40. Furthermore, the network applications included in the plural user PCs 20 may correspond to different functions.

The network application management server 30 is a computer including an application information registration unit 31, a publicizing unit 32, an application information providing unit 33, and a mediation unit 34. The application information registration unit 31 receives, from the user PC 20, a request to register application information, and saves the application information in an application information management table 35. The application information management table 35 is generated in a storage device of the network application management server 30 for each user. That is to say, each application information management table 35 manages application information of a network application belonging to one of the users. The publicizing unit 32 publicizes (broadcasts or multicasts), on the network 40, a user ID included in the application information received by the application information registration unit 31. The publication is issued for each user (for each user ID). For example, when a user ID of user A has already been publicized, and then application information belonging to user A is newly received, the publicizing unit 32 will not issue a publication corresponding to the new application information. That is to say, the information publicized by the publicizing unit 32 is used for sending a notification to the image forming apparatus 10 that there is a new user who is allowed to use a certain network application. However, in another example, the publication may be issued for each application information item. In this case, plural publications will be issued for the same user, but redundant information may be deleted at the image forming apparatus 10. The application information providing unit 33 provides (sends) application information registered in the application information management table 35 to the image forming apparatus 10, in response to a request from the image forming apparatus 10. The mediation unit 34 mediates communications between network applications and the image forming apparatus 10.

Any one of the user PCs 20 may also serve as the network application management server 30. That is to say, any one of the user PCs 20 may include the application information registration unit 31, the publicizing unit 32, the application information providing unit 33, and the mediation unit 34.

The image forming apparatus 10 is a multifunction peripheral that can implement plural functions such as printing, scanning, copying, and transmitting/receiving information by fax communications, in a single casing. However, in another example, the image forming apparatus 10 may be a device for implementing any one of these functions (such as a printer, a scanner, a copier, or a fax machine). The image forming apparatus 10 includes a user detection unit 121, a UI control unit 122, an application information acquiring unit 123, a network application coordination unit 124, a function control unit 125, a user management table 126, and a print data processing unit 127.

The user detection unit 121 detects the presence of a user who is allowed to use a network application based on a publication issued by the network application management server 30, and registers a user ID included in the publication in the user management table 126. The user management table 126 is for managing a list of users that are allowed to use network applications that are present in the network 40. The UI control unit 122 receives, from a user, input of an operation instruction for a network application. The network application is located in the user PC 20, but the network application may be operated from the operations panel of the image forming apparatus 10. The application information acquiring unit 123 acquires, from the network application management server 30, application information of a network application belonging to a user selected from among the users registered in the user management table 126. The network application coordination unit 124 controls communications between the image forming apparatus 10 and the network application. The function control unit 125 controls execution of a function requested by the network application. For example, the function control unit 125 controls execution of a printing operation or a scanning operation. The print data processing unit 127 generates a print image based on print data.

Figure 2:
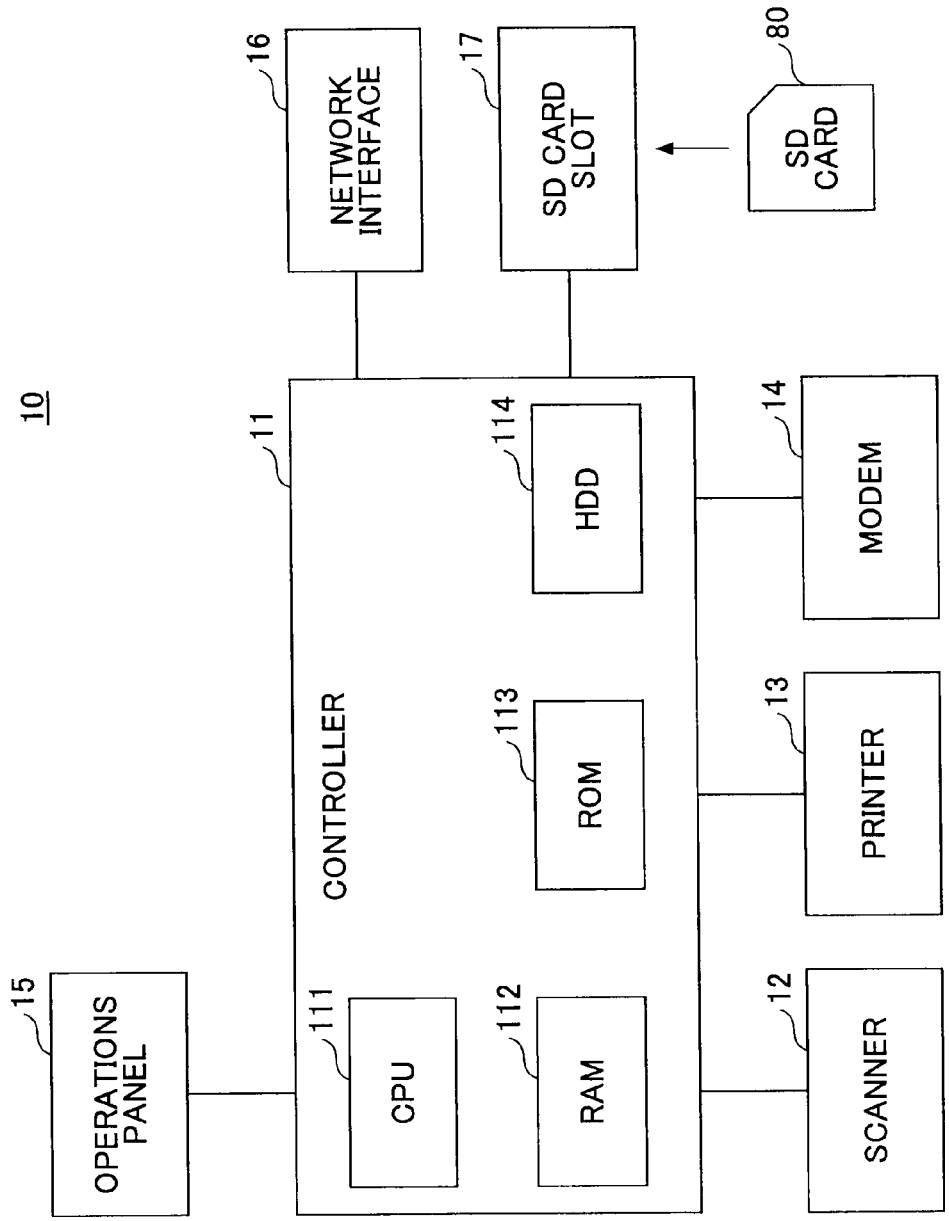
FIG. 2 illustrates a hardware configuration of an image forming apparatus according to an embodiment of the present invention.

Next, a description is given of a hardware configuration of the devices. FIG. 2 illustrates a hardware configuration of the image forming apparatus 10 according to an embodiment of the present invention. As shown in FIG. 2, the image forming apparatus 10 includes hardware elements such as a controller 11, a scanner 12, a printer 13, a modem 14, an operations panel 15, a network interface 16, and an SD card slot 17.

The controller 11 includes a CPU 111, a RAM 112, a ROM 113, and an HDD 114. The ROM 113 stores various programs and data used by the programs. The RAM 112 is used as a storage area for loading programs and a work area of the loaded programs. The CPU 111 executes the program loaded in the RAM 112 to implement various functions. The HDD 114 stores various programs and data used by the programs.

The scanner 12 is a hardware element for scanning an original to obtain image data. The printer 13 is a hardware element for printing the image data onto a sheet. The modem 14 is a hardware element for connecting the image forming apparatus 10 to a telephone line, and for executing transmission/reception of image data by fax communications. The operations panel 15 is a hardware element including an input unit such as buttons for receiving input from a user, and a display unit such as a liquid crystal panel. The network interface 16 is a hardware element for connecting the image forming apparatus 10 to a network (wired or wireless) such as a LAN (Local Area Network). The SD card slot 17 is used for reading a program recorded in an SD card 80. That is to say, the image forming apparatus 10 may not only execute the program recorded in the ROM 113, but may also load the program recorded in the SD card 80 into the RAM 112, and execute the program loaded in the RAM 112.

Figure 3:
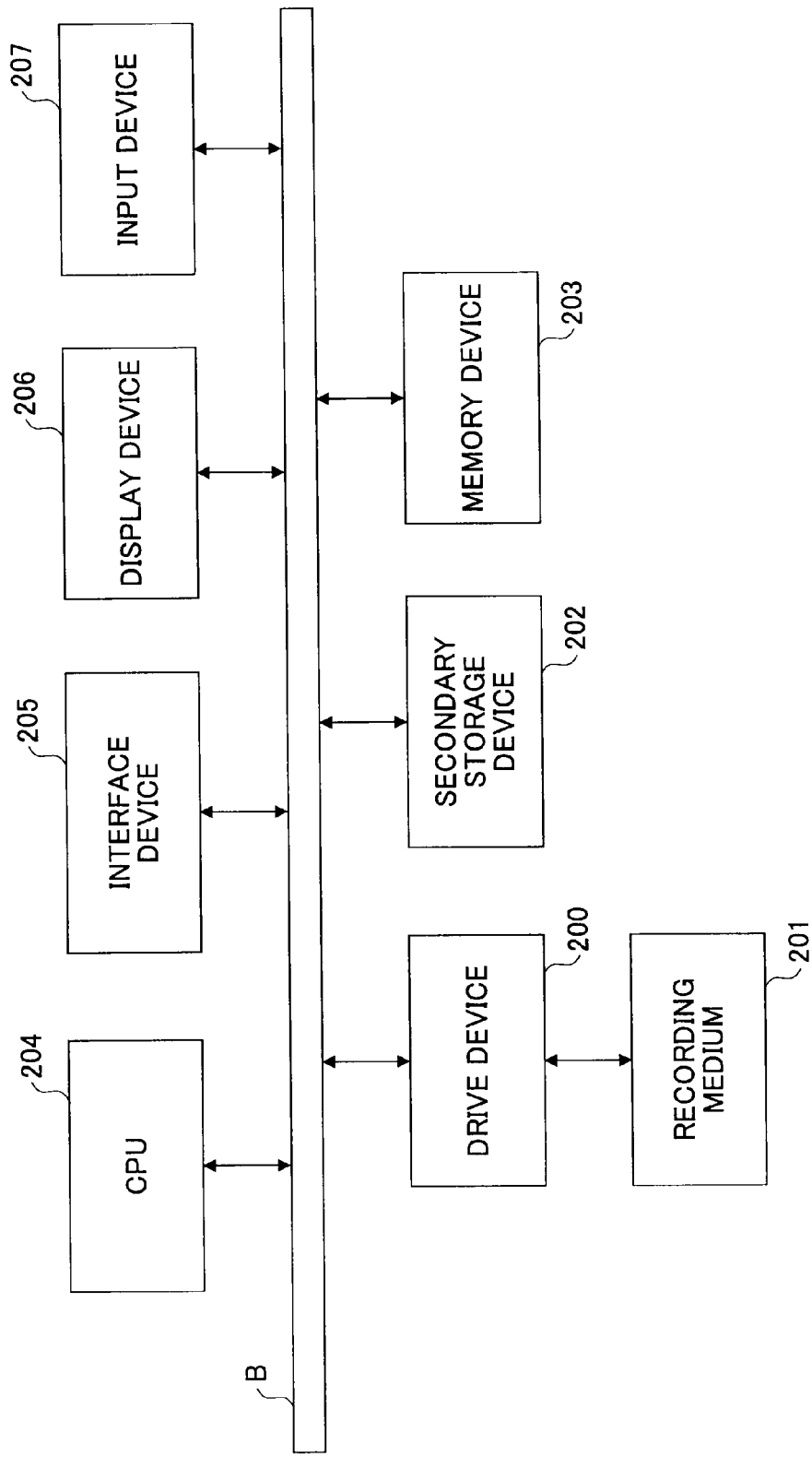
FIG. 3 illustrates a hardware configuration of a user PC according to an embodiment of the present invention.

FIG. 3 illustrates a hardware configuration of the user PC 20 according to an embodiment of the present invention. The user PC 20 illustrated in FIG. 3 includes a drive device 200, a secondary storage device 202, a memory device 203, a CPU 204, an interface device 205, a display device 206, and an input device 207, which are interconnected via a bus B.

A program that implements a process of the user PC 20 is provided in a recording medium 201 such as a CD-ROM. When the recording medium 201 storing the program is set in the drive device 200, the program is installed from the recording medium 201 into the secondary storage device 202 via the drive device 200. However, the program need not be installed from the recording medium 201; the program may be downloaded from another computer via a network. The secondary storage device 202 stores the installed program, together with necessary files and data.

The memory device 203 reads the program from the secondary storage device 202 and stores the program, when an instruction to activate the program has been given. The CPU 204 implements the functions pertaining to the user PC 20 in accordance with the program stored in the memory device 203. The interface device 205 is used as an interface for connecting the user PC 20 to a network. The display device 206 displays a GUI (Graphical User Interface) by a program. The input device 207 may include a keyboard and a mouse, which is used for inputting various operation instructions.

A description is given of a process performed by the information processing system 1. First, a description is given of a process of registering application information in the network application management server 30, for each network application (print application 21, scan application 22).

Figure 4:
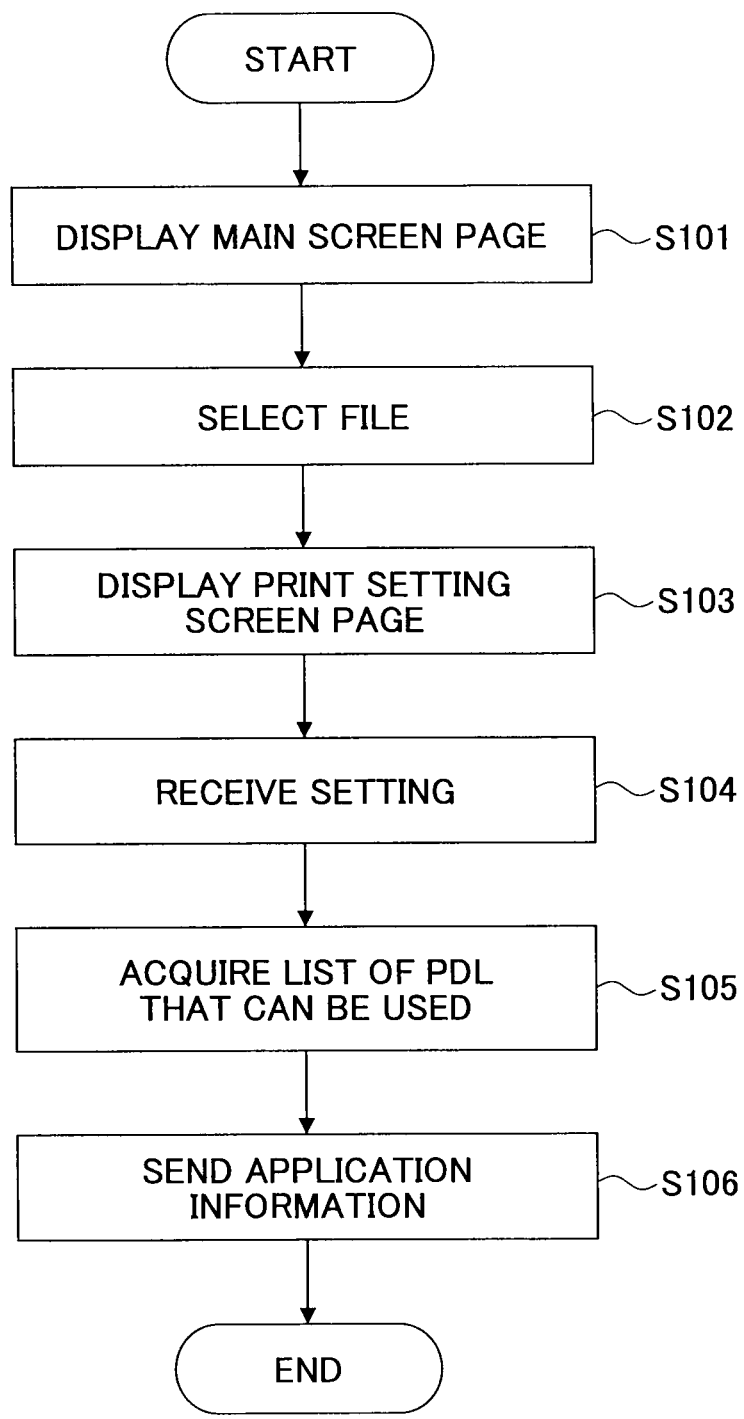
FIG. 4 is a flowchart for describing the process of inputting a job to a print application.

FIG. 4 is a flowchart for describing the process of inputting a job to the print application 21.

In response to an instruction to activate the print application 21 that is input to the user PC 20 by a user, the UI control unit 211 causes the display device 206 to display a main screen page of the print application 21 (step S101). Next, the UI control unit 211 receives a selection of a document file that is to be the print target, from the user (step S102). The selection of the document file may be performed by dragging and dropping a document file icon into the main screen page of the print application 21.

Figure 5:
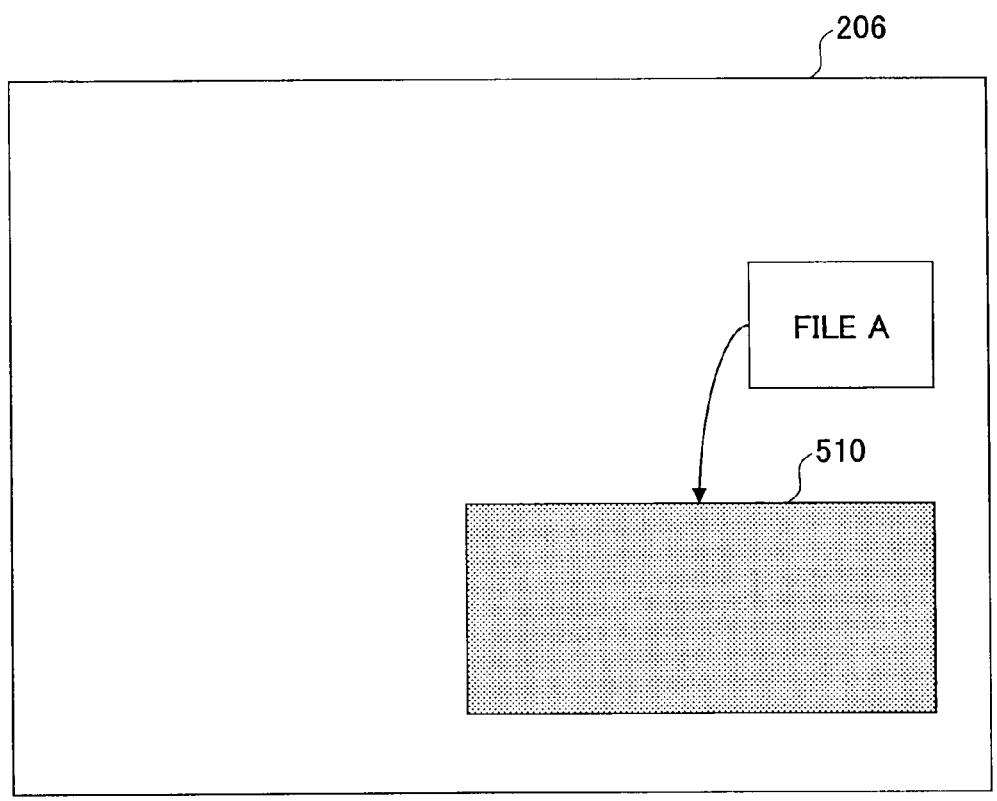
FIG. 5 illustrates how a document file is dragged and dropped into a main screen page.

FIG. 5 illustrates how the document file is dragged and dropped into the main screen page. As shown in FIG. 5, an icon of a file A is dragged and dropped into a main screen page 510 displayed on the display device 206. The main screen page 510 is merely illustrated as a rectangle, but may include various display elements such as a tool bar and a pull-down menu. The document file may be selected with a file dialogue (dialogue for selecting a file that is present in a file system), which is displayed by selecting a tool button or a menu item.

In response to a document file being selected, the UI control unit 211 records the file name of the selected document file and the type of file (file format) in the memory device 203. The type of file can be determined by the file extension.

Next, the UI control unit 211 causes the display device 206 to display the icon of the selected document file in the main screen page 510, and to also display a print setting screen page (step S103).

Figure 6:
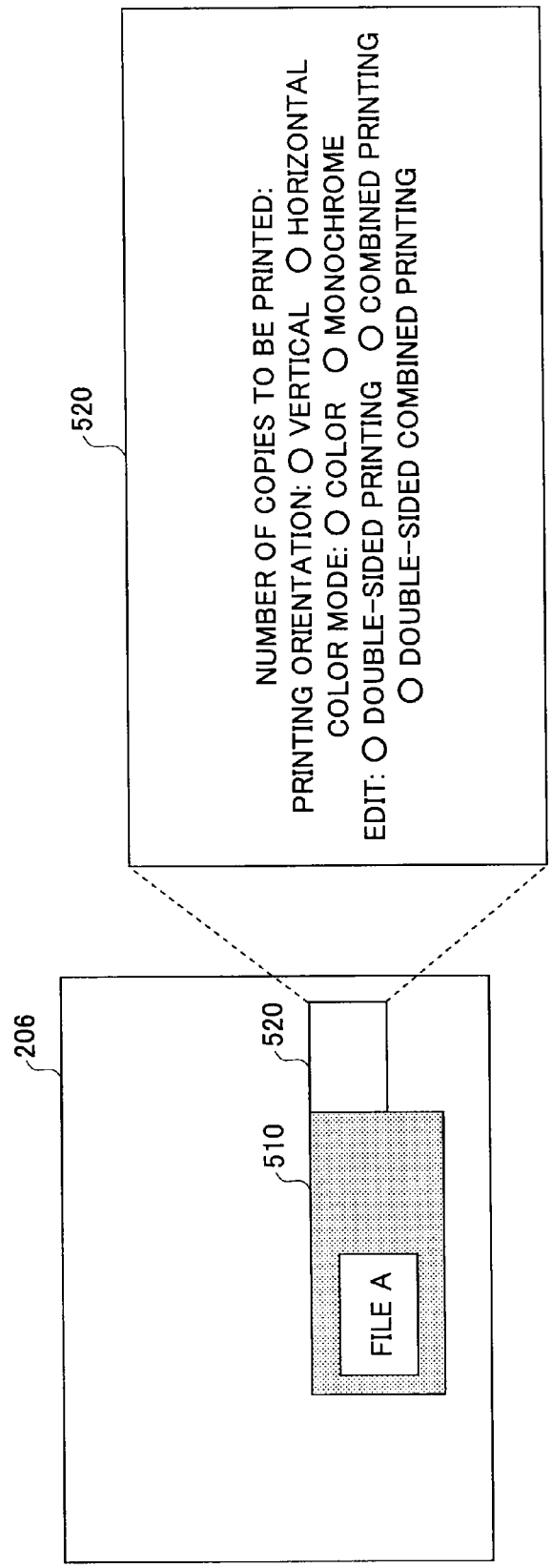
FIG. 6 illustrates an example of a displayed print setting screen page.

FIG. 6 illustrates an example of a displayed print setting screen page. As shown in FIG. 6, a print setting screen page 520 is displayed on the right side of the main screen page 510. Detailed display elements of the print setting screen page 520 are shown on the right side in FIG. 6. In the example shown in FIG. 6, settings can be made in the print setting screen page 520 with respect to the number of copies to be printed, the printing orientation, the color mode, double-sided printing, combined printing, etc. These setting items are merely examples, and the types of settings items are not limited to these examples.

When values for the setting items are set in the print setting screen page 520, the UI control unit 211 records the set information (hereinafter, "print setting information") in the memory device 203 (step S104).

The initial values displayed for the items in the print setting screen page 520 are acquired from the attribute information management file 215. That is to say, the attribute information management file 215 includes print setting information desired by the user in advance. Thus, the print setting screen page 520 does not necessarily need to be displayed. When the print setting screen page 520 is not displayed, the print setting information acquired from the attribute information management file 215 is loaded in the memory device 203.

Next, the application information sending unit 212 acquires a list of types of printer page description languages (PDL) corresponding to printer drivers installed in the user PC 20 (step S105). The list of types of printer page description languages may be acquired as follows. First, a list of printer drivers installed in the user PC 20 is acquired. Then, the printer page description languages corresponding to the printer drivers in the acquired list are acquired from the corresponding printer drivers.

Next, the application information sending unit 212 generates application information of the print application 21 based on the information acquired in the above steps, and sends a request to register the generated application information to the network application management server 30 (step S106). Each user PC 20 has information (IP address, host name, etc.) registered in advance, which is used for communicating with the network application management server 30.

FIG. 7 illustrates an example of application information of the print application 21. As shown in FIG. 7, the application information of the print application 21 includes an application ID, a user ID, a coordination function identifier, a network application address, a display name, print setting information, a file name, a file format, and a PDL list.

The application ID contains identification information for uniquely identifying each of the network applications. The user ID contains identification information of a user who is the owner of the print application 21. The coordination function identifier contains information for identifying a requested function included in the image forming apparatus 10 with which the net application is in coordination (that is to say, a function used by the net application). Examples of the coordination function identifier are "print" and "scan". "Print" indicates a print function. "Scan" indicates a scan function. The print application 21 uses the print function of the image forming apparatus 10. Therefore, in the example shown in FIG. 7, "print" is indicated as the coordination function identifier. A network application address is identification information (such as a URL (Uniform Resource Locator)) for uniquely identifying each of the network applications in network communications. A display name is a character string for displaying the name of the network application. The application ID, the user ID, the coordination function identifier, the network application address, and the display name are acquired from, for example, the attribute information management file 215.

Print setting information may be set in the print setting screen page 520 or may be acquired from the attribute information management file 215. The file name and file format are acquired from the document file, which is selected as the print target, and recorded in the memory device 203. The PDL list is a list, which is acquired by the application information sending unit 212, including printer page description languages that can be used by (can be output by) the printer drivers included in the user PC 20.

Figure 8:
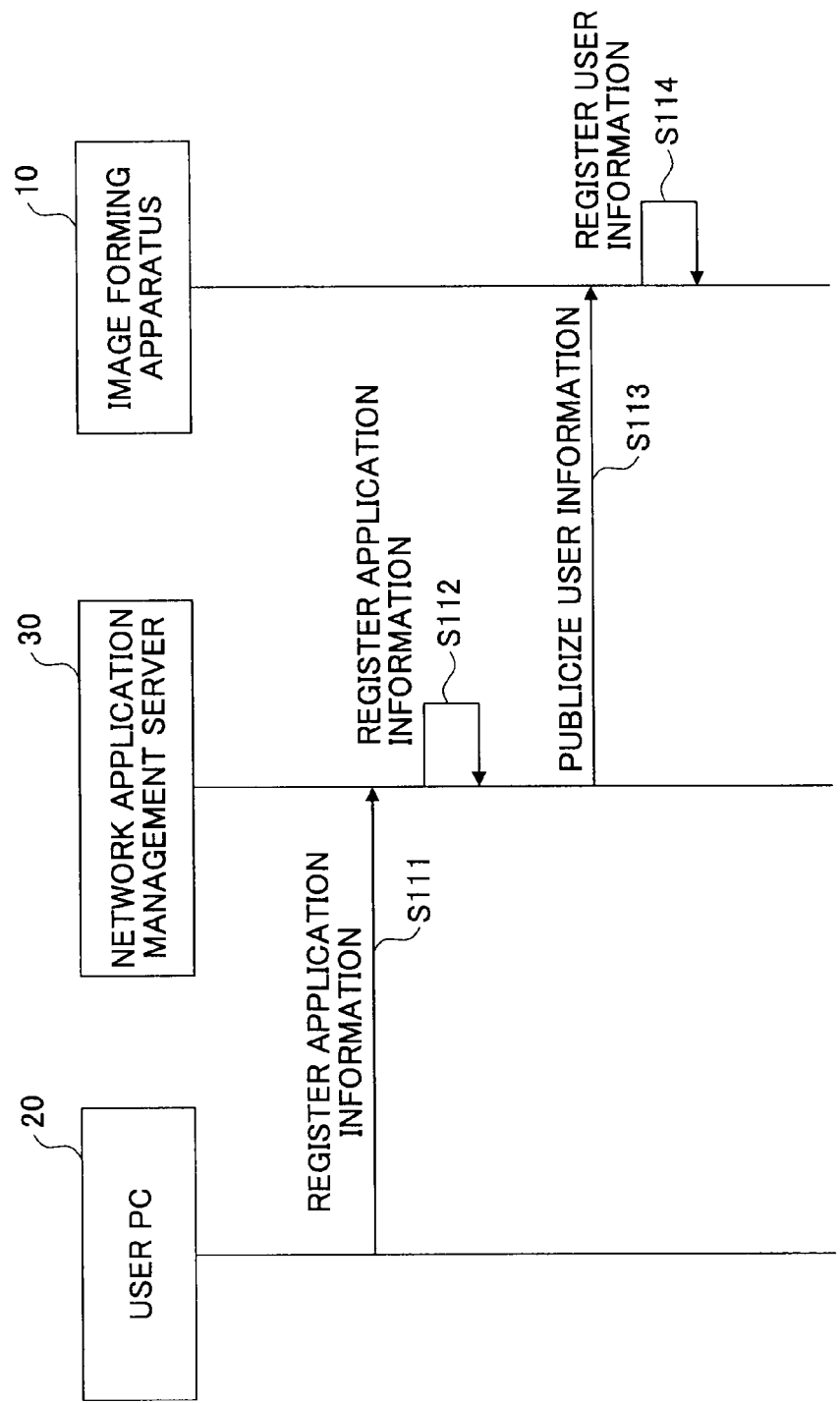
FIG. 8 is a sequence diagram for describing the process executed when sending the application information.

Next, a description is given of a process executed when sending the application information in step 5106. FIG. 8 is a sequence diagram for describing the process executed when sending the application information.

In step S111, the application information sent by the application information sending unit 212 is received by the application information registration unit 31 of the network application management server 30. The application information registration unit 31 registers the application information in the application information management table 35 corresponding to the user ID included in the received application information. When there is no application information management table 35 corresponding to the user ID, the application information registration unit 31 generates a application information management table 35 that corresponds to the user ID, and registers the application information in the generated application information management table 35 (step S112).

When a new application information management table 35 is generated (i.e., when application information relevant to a user corresponding to the user ID included in the received application information is registered for the first time), the publicizing unit 32 issues a publication in the network 40

(step S113). The publication includes the user ID included in the received application information and a URL for acquiring the application information (hereinafter, "application information acquisition URL"). The application information acquisition URL is a URL that is unique to each application information management table 35. The application information management table 35 is generated for each user. Consequently, the application information acquisition URL is unique to each user.

Next, when the publication is received, the user detection unit 121 of the image forming apparatus 10 registers, in the user management table 126, the user IC and the application information acquisition URL included in the publication (step S114).

Figure 9:
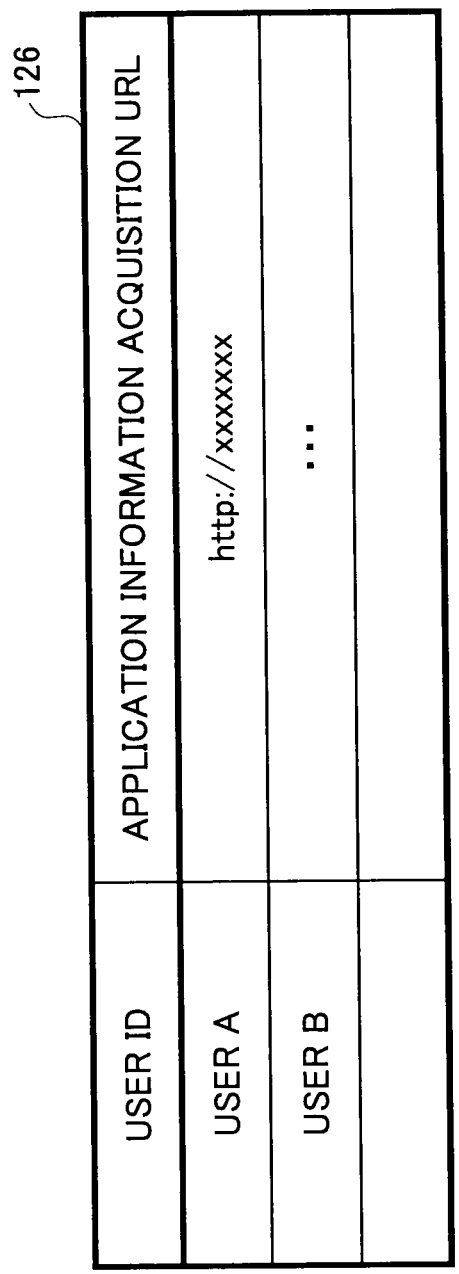
FIG. 9 illustrates an example of a user management table.

FIG. 9 illustrates an example of the user management table 126. As shown in FIG. 9, the user management table 126 manages pairs of user IDs and URLs for acquiring application information. The example shown in FIG. 9 includes records registered for user A and user B. The user management table 126 may be stored in the HDD 114.

As described above, in the case of the print application 21, the application information is registered in the network application management server 30 for each print job. Therefore, when the same user continuously drags and drops another document file icon in the main screen page 510, application information regarding this document file is registered in the network application management server 30. However, for this document file, the publicizing unit 32 of the network application management server 30 does not issue a publication, because a publication regarding the user has already been issued.

Next, a description is given of a process of registering application information of the scan application 22 in the network application management server 30.

When an instruction to activate the scan application 22 is input to the user PC 20 by a user, the UI control unit 221 causes the display device 206 to display a main screen page of the scan application 22.

Figure 10:
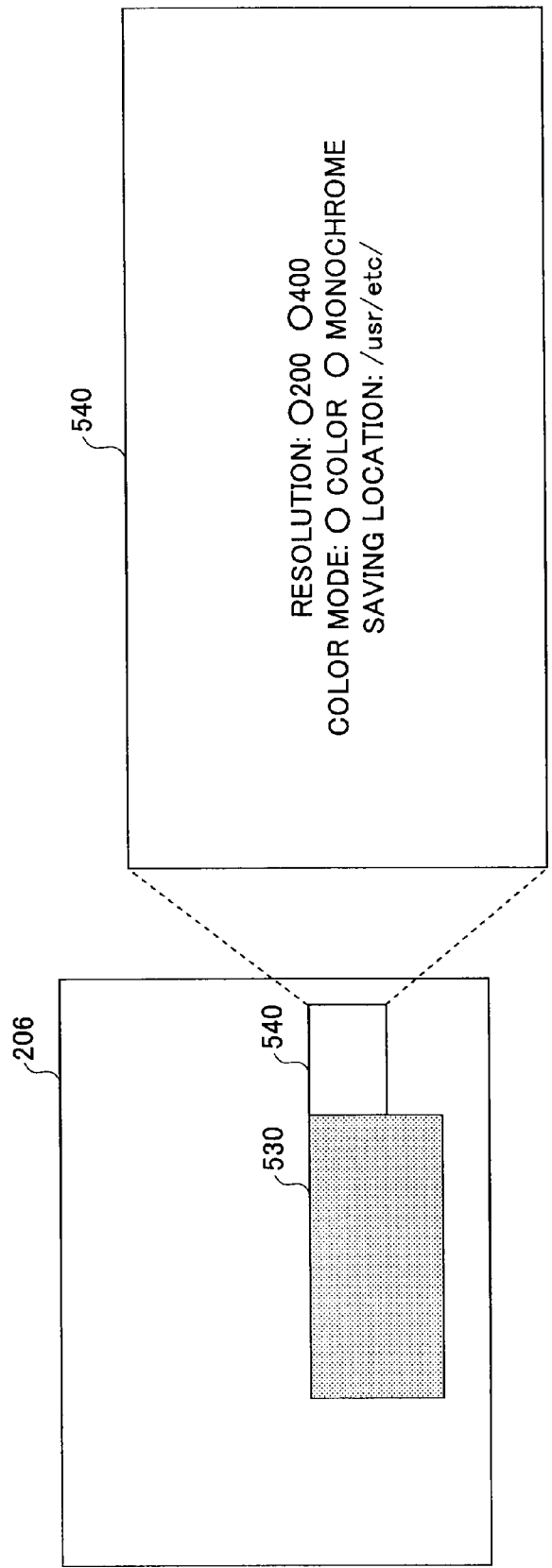
FIG. 10 illustrates an example of a displayed main screen page of a scan application.

FIG. 10 illustrates an example of a displayed main screen page of the scan application 22. As shown in FIG. 10, a scan setting screen page 540 is appended to the right side of a main screen page 530 of the scan application 22. Detailed display elements of the scan setting screen page 540 are shown on the right side in FIG. 10. In the example shown in FIG. 10, settings can be made in the scan setting screen page 540 with respect to the resolution, the color mode (color or monochrome), the path name in the file system of the user PC 20 corresponding to a location for saving image data (scanned image) obtained by a scanning process, etc. These setting items are merely examples, and the types of settings items are not limited to these examples.

When values for the setting items are set in the scan setting screen page 540, the UI control unit 211 records the set information (hereinafter, "scan setting information") in the memory device 203.

The initial values displayed for the items in the scan setting screen page 540 are acquired from the attribute information management file 225. That is to say, the attribute information management file 225 includes scan setting information desired by the user in advance. Thus, the scan setting screen page 540 does not necessarily need to be displayed. When the scan setting screen page 540 is not displayed, the scan setting information acquired by the attribute information management file 225 is loaded in the memory device 203.

Next, the application information sending unit 222 generates application information of the scan application 22 based on the information acquired in the above steps, and sends a request to register the generated application information to the network application management server 30.

FIG. 11 illustrates an example of application information of the scan application 22. As shown in FIG. 11, the application information of the scan application 22 includes an application ID, a user ID, a coordination function identifier, a network application address, a display name, and scan setting information.

The meanings of the application ID, the user ID, the coordination function identifier, the network application address, and the display name are the same as those of the application information (FIG. 7) of the print application 21. However, the values of the items other than the user ID are different from those of the print application 21. Specifically, values of the application ID, the network application address, and the display name are those of the scan application 22. Furthermore, the scan application 22 uses a scan function of the image forming apparatus 10, and therefore the value of the coordination function identifier is "scan".

The scan setting information may be set in the scan setting screen page 540 or may be acquired from the attribute information management file 225.

The application information (FIG. 11) sent to the network application management server 30 by the application information sending unit 222 of the scan application 22 is processed by the same process described with reference to FIG. 8. The application information registration unit 31 of the network application management server 30 registers the application information in the application information management table 35 corresponding to the user ID included in the application information. When a publication for the user ID has already been issued, the process of issuing a publication in step S113 of FIG. 8 is not performed.

As described above, in the case of the scan application 22, the application information is registered in the network application management server 30 for each application, instead of for each job as in the case of the print application 21.

After a print request is input (a print job is input) to the user PC 20 for the print application 21, or after the scan application 22 has been activated, the user moves to a place where the image forming apparatus 10 is installed, in order to operate the print application 21 or the scan application 22. When plural image forming apparatuses 10 are connected to the network 40, the same publication is received by the respective user detection units 121 of the image forming apparatuses 10, and the user ID and the application information acquisition URL are registered in the respective user management tables 126 of the image forming apparatuses 10. Therefore, the user can operate the network application from any of the image forming apparatuses 10.

Next, a description is given of a process executed as the user operates the image forming apparatus 10.

Figure 12:
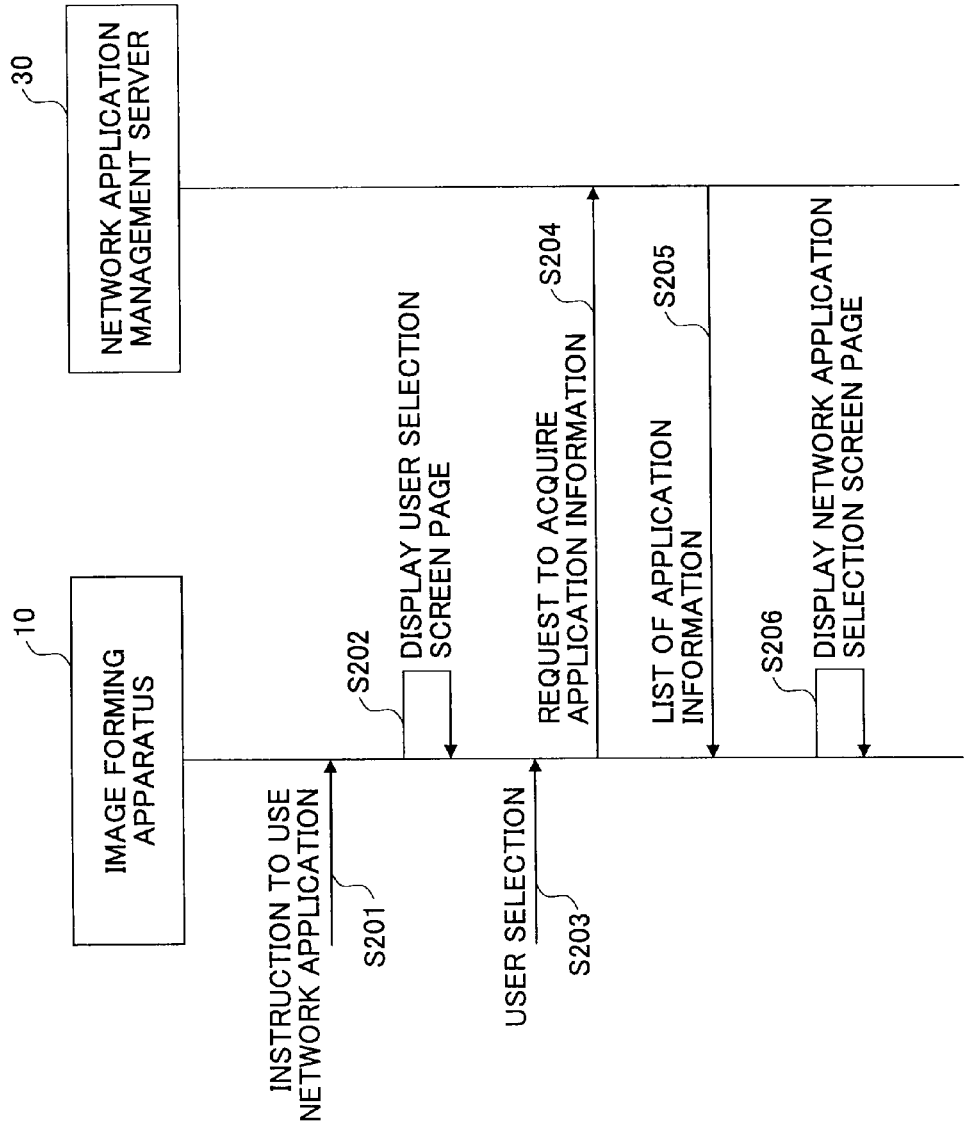
FIG. 12 is a sequence diagram for describing the process of displaying a list of network applications that can be used for the user.

FIG. 12 is a sequence diagram for describing the process of displaying a list of network applications that can be used by the user.

When the user inputs an instruction to use a network application via the operations panel 15 (step S201), the UI control unit 122 of the image forming apparatus 10 causes the operations panel 15 to display a user selection screen page based on information registered in the user management table 126 (step S202). In step S202, the UI control unit 122 may acquire user information from the network application management server 30, and cause the operations panel 15 to display the user selection screen page based on the acquired user information. In this case, step S113 of FIG. 8 does not necessarily need to be performed. However, for example, step S113 may be executed by unicast to a particular image forming apparatus 10 having a different subnetwork from that of the network application management server 30 (a particular image forming apparatus 10 whose IP address is registered in the network application management server 30 in advance).

Figure 13:
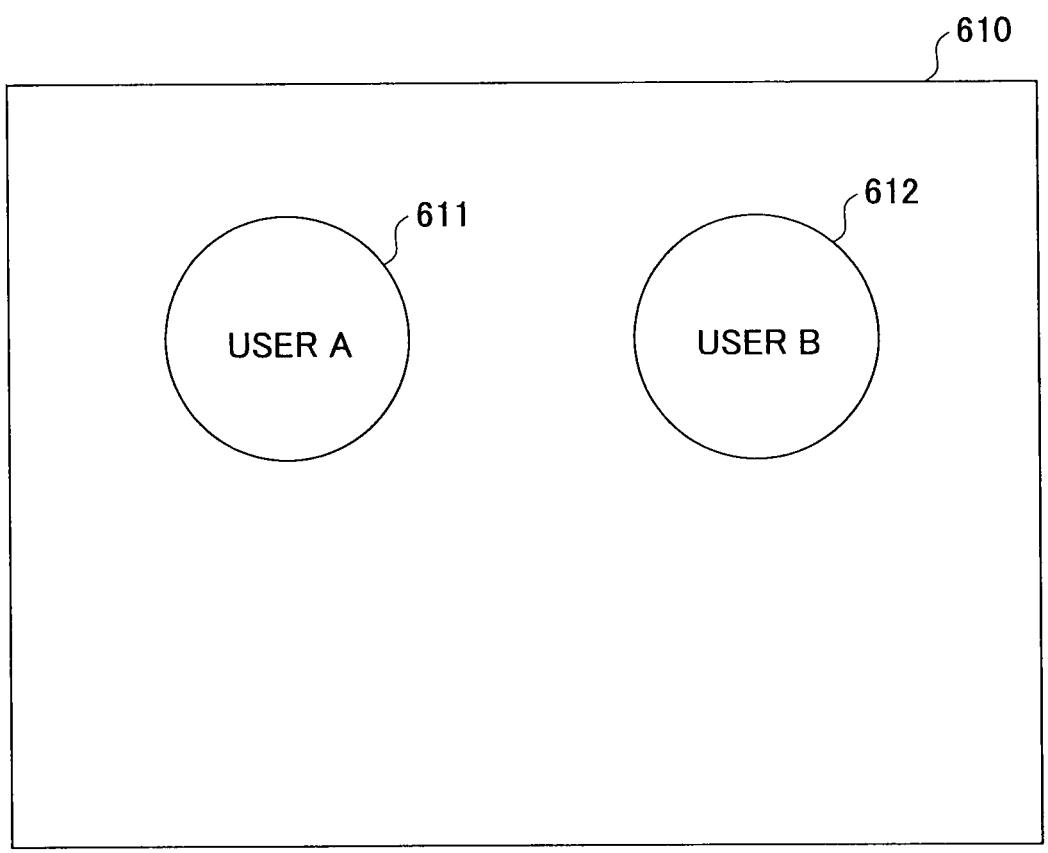
FIG. 13 illustrates an example of a displayed user selection screen page.

FIG. 13 illustrates an example of a displayed user selection screen page. A user selection screen page 610 shown in FIG. 13 has a button displayed for each user. In FIG. 13, a button 611 corresponding to user A and a button 612 corresponding to user B are displayed.

Next, the user presses the button corresponding to his own user ID in the user selection screen page 610 (step S203). As the button is pressed, the application information acquiring unit 123 acquires, from the user management table 126, an application information acquisition URL that is associated with the user ID corresponding to the selected button. User authentication may be performed as the button corresponding to the user ID is pressed, and the succeeding processes may be executed only when the user authentication is successful.

Next, the application information acquiring unit 123 sends a request to acquire application information, to the application information acquisition URL (step S204). The request for acquiring application information is received by the application information providing unit 33 of the network application management server 30. The application information providing unit 33 acquires application information of all network applications registered in the application information management table 35 corresponding to the application information acquisition URL (i.e., the application information management table 35 corresponding to the user operating the image forming apparatus 10), and sends a list of the acquired application information to the image forming apparatus 10 (step S205). When sending the list of application information items, the application information providing unit 33 generates a URL that is unique to each of the network applications (each of the application information items) for relaying communications between the image forming apparatus 10 and the network applications (hereinafter, "network application relay URL"). The application information providing unit 33 adds the network application relay URL generated for each network application, to the application information of the corresponding network application. Then, the application information providing unit 33 sends, to the image forming apparatus 10, a list of application information items to which the URLs for relaying network applications have been added. Thus, each application information item sent at step S205 may have one of the configurations illustrated in FIG. 14 and FIG. 15.

FIG. 14 illustrates a configuration of the application information of the print application 21 sent from the network application management server 30 to the image forming apparatus 10. FIG. 15 illustrates a configuration of the application information of the scan application 22 sent from the network application management server 30 to the image forming apparatus 10.

The application information shown in FIGS. 14 and 15 is formed by adding the network application relay URL to the application information shown in FIGS. 7 and 11, respectively. In step S205, the application information providing unit 33 sends a list of application information items, each application information item having a configuration as shown in FIG. 14. The list of application information items may include only one application information item.

The network application relay URL may be generated and added to the application information when the application information registration unit 31 registers the application information in the application information management table 35.

Next, the UI control unit 122 of the image forming apparatus 10 records the received list of application information items in the RAM 112, and causes the operations panel 15 to display a screen page (network application selection screen page) including a list of network applications that can be used by the user, based on the list of application information items (step S206).

Figure 16:
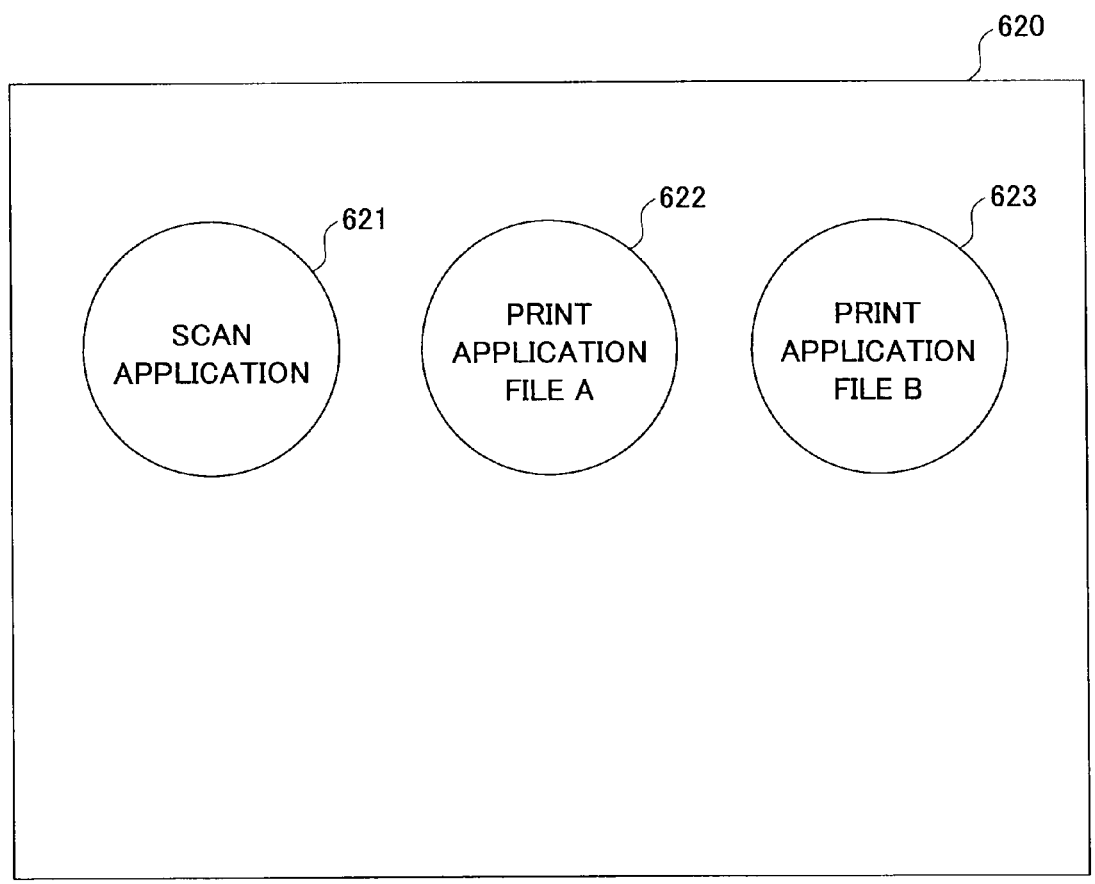
FIG. 16 illustrates an example of a displayed network application selection screen page.

FIG. 16 illustrates an example of a displayed network application selection screen page. A network application selection screen page 620 shown in FIG. 16 has buttons displayed for network applications. In FIG. 16, the network application selection screen page 620 is displaying a button 621 corresponding to the scan application 22, a button 622 corresponding to the print application 21 for a print request for file A, and a button 623 corresponding to the print application 21 for a print request for file B.

In the case of the scan application 22, each of the displayed buttons corresponds to an application. Meanwhile, in the case of the print application 21, each of the displayed buttons corresponds to a print request (i.e., print job). This is attributed to the difference between these two network applications, in terms of the timing of issuing a request to register the application information. That is to say, as described with reference to FIG. 4, the print application 21 issues a request to register the application information (sends the request to the network application management server 30) in response to an input of a print request. Thus, when a print request for file A is input, and then a print request for file B is input, the processes of FIGS. 4 and 8 are executed for each of the document files. For this reason, in the case of the print application 21, application information is registered in the application information management table 35 for each print request (for each print job).

Meanwhile, in the case of the scan application 22, application information is issued when the scan application 22 is activated. That is to say, the process of FIG. 8 is executed when the scan application 22 is activated. Thus, the application information of the scan application 22 is registered in the application information management table 35 for each application.

In the network application selection screen page 620, each of the displayed buttons corresponds to an application information item. As for the print application 21, each of the displayed buttons corresponds to a print request (print job). As for the scan application 22, each of the displayed buttons corresponds to an application.

As for the print application 21, each of the displayed buttons corresponds to a print job in consideration of operability and effective usage of the screen page area. If each of the displayed buttons of the print application 21 corresponds to an application, the following disadvantages may arise. Specifically, in this case, operations need to be performed for (1) giving an instruction to use a network application→(2) selecting the user in the user selection screen page 610→(3) selecting the print application 21 in the network application selection screen page 620→(4) selecting a file as a print target (the number in parenthesis indicates the serial number of operations). Thus, an input operation needs to be performed at least four times. Moreover, the operability of the operations panel 15 of the image forming apparatus 10 is typically inferior to that of a user interface (mouse, keyboard) of a PC (personal computer). Thus, the operation of using such an operations panel 15 to select a document file as a print target requires high workload. Furthermore, in order to select a document file saved in the user PC 20 from the image forming apparatus 10, a specific program needs to be installed in the image forming apparatus 10, which entails increased cost.

Conversely, if each of the displayed buttons of the print application 21 corresponds to a print job as in the present embodiment, only three input operations are required, i.e., (1) giving an instruction to use a network application→(2) selecting the user in the user selection screen page 610→(3) selecting the print application 21 in the network application selection screen page 620.

Thus, as for the print application 21 according to the present embodiment, a request to register application information is issued in response to each print request, so that each of the displayed buttons corresponds to a print job.

Furthermore, if each of the displayed buttons of the print application 21 corresponds to a print job, there is no need to display a button for the print application 21 when no print jobs have been input. Therefore, in this case, the limited area of the screen page region can be used effectively.

Meanwhile, in the case of the scan application 22, a job is input (image data corresponding to the process target of the job is input) at the image forming apparatus 10, unlike the case of the print application 21. Furthermore, at the stage of displaying the network application selection screen page 620, image data is not yet input (i.e., a unit of a job is not yet established). Thus, in the case of the scan application 22, each of the displayed buttons corresponds to an application, instead of a job.

The process performed after the network application selection screen page 620 has been displayed may vary according to the type of the network application selected as an execution target. Therefore, descriptions are given separately for the case where the print application 21 is selected and the case where the scan application 22 is selected.

FIG. 17 is a sequence diagram for describing the process of the print application 21.

In the network application selection screen page 620, a button corresponding to one of the print jobs of the print application 21 is selected, and a start key in the operations panel 15 is pressed (step S208). Then, the network application coordination unit 124 recognizes that printing is to be executed, based on a coordination function identifier ("print") included in application information corresponding to the pressed button (hereinafter, "current application information"). In order to execute printing, it is necessary to obtain print data. Therefore, the network application coordination unit 124 sends a request to have print data sent ("print-data-send request") to the network application relay URL included in the current application information (step S209). The print-data-send request includes the file name and the type of printer page description language included in the current application information. The specified printer page description language is selected from the PDL list included in the current application information, as the printer page description language that can be interpreted by the print data processing unit 127 of the image forming apparatus 10.

The print-data-send request that is sent to the network application relay URL is received by the mediation unit 34 of the network application management server 30. The mediation unit 34 acquires application information corresponding to the network application relay URL from the application information management table 35, and transfers the print-data-send request to the network application address included in the application information (step S210).

The print-data-send request that is sent to the network application address is received by the coordination unit 213 of the print application 21 in the user PC 20. The coordination unit 213 requests the print data generating unit 214 to generate print data, in response to the print-data-send request. The print data generating unit 214 acquires, from the secondary storage device 202, a document file corresponding to the file name specified in the print-data-send request, and generates print data of the acquired document file (step S211). The print data generating unit 214 generates print data of the document file by using a printer driver that can generate the printer page description language specified in the print-data-send request.

Next, the coordination unit 213 returns the generated print data to the mediation unit 34 of the network application management server 30 (step S212). Next, the mediation unit 34 transfers the print data to the network application coordination unit 124 of the image forming apparatus 10 (step S213).

The network application coordination unit 124 inputs the received print data to the function control unit 125. Next, the function control unit 125 causes the print data processing unit 127 to generate a print image based on the print data, and causes the printer 13 to transfer the generated print image onto a print sheet (step S214).

Next, a description is given of a case where the scan application 22 is selected. FIG. 18 is a sequence diagram for describing the process of the scan application 22.

In the network application selection screen page 620, a button corresponding to the scan application 22 is selected, and a start key in the operations panel 15 is pressed (step S401). Then, the network application coordination unit 124 recognizes that scanning is to be executed, based on a coordination function identifier ("scan") included in application information corresponding to the pressed button (hereinafter, "current application information"). The network application coordination unit 124 requests the function control unit 125 to execute scanning.

The function control unit 125 controls the operation of scanning an original to obtain image data, based on scan setting information included in the current application information (step S402). More specifically, the function control unit 125 causes the scanner 12 to scan an original that is set in the image forming apparatus 10 by a user, and outputs the image data obtained as a result of the scanning process to the network application coordination unit 124. The network application coordination unit 124 sends the image data to a network application relay URL included in the current application information (step S403). The image data sent to the network application relay URL is received by the mediation unit 34 of the network application management server 30.

After the application information has been sent, the scan application 22 performs polling at certain intervals to confirm whether image data has been obtained by a scanning process at the image forming apparatus 10. Specifically, the coordination unit 223 of the scan application 22 sends a request to acquire image data obtained by a scanning process (scan image data) to the mediation unit 34 of the network application management server 30 (step S411). The mediation unit 34 responds to the acquiring request (step S412). Image data is not obtained by a scanning process before step S413, and therefore a response indicating that there is no scan image is returned from the mediation unit 34 to the coordination unit 223.

When a request to acquire a scan image is received from the coordination unit 223 after a scan image has been received (step S413), the mediation unit 34 returns the scan image received at step S403 to the coordination unit 223 (step S414). The coordination unit 223 inputs the scan image to the scan data processing unit 224. The scan data processing unit 224 executes a process (logic) installed in the scan data processing unit 224, on the scan image that is the process target (step S415). For example, the scan data processing unit 224 saves the scan image in a saving destination set in the attribute information management file 225. When the process on the scan image data ends, the coordination unit 223 resumes polling in order to be prepared for the next scanning operation (steps S416 and S417).

While executing the process shown in FIG. 12, 17, or 18, the process shown in FIG. 8 may be executed in parallel. Specifically, a user ID included in application information may be registered in the user management table 126 of the image forming apparatus 10, based on a request to register application information received from a network application included in one of the user PCs 20 corresponding to a user other than the user who is currently operating the image forming apparatus 10.

In the present embodiment, a description is given of an example where the network application management server 30 mediates the user PC 20 and the image forming apparatus 10. In the present embodiment, the network application management server 30 is the only device with which the image forming apparatus 10 communicates, which is advantageous because the communication protocol used by the image forming apparatus 10 can be limited to that for the network application management server 30. Furthermore, the communications traffic to the image forming apparatus 10 can be reduced. However, in another example, the user PC 20 and the image forming apparatus 10 may directly communicate with each other. In this case, the user PC 20 may include the functions of the network application management server 30.

As described above, according to the present embodiment, the operations panel 15 of the image forming apparatus 10 can be used to execute a workflow installed in an arbitrary network application incorporating a function of the image forming apparatus 10. Setting information of a function of the image forming apparatus 10 is stored in units of network applications associated to the respective users. Therefore, a workflow that is highly individual (unique to each user) can be implemented.

Furthermore, the users perform a common operation for executing the network applications, even for different functions or workflows (i.e., select a button in the network application selection screen page 620 and press the start key). Therefore, the user (operator) does not need to learn operation processes for executing different functions or workflows.

Furthermore, the image forming apparatus 10 only needs to provide a simple image input/output function for the user; any other process can be performed at the user PC 20. Therefore, the image forming apparatus 10 does not need to be provided with complex functions, while the user PC 20 can be used to implement complex functions. This is advantageous because the user PC 20 has fewer constraints than the image forming apparatus 10 in various respects.

The network applications are automatically detected and registered in the image forming apparatus 10. Therefore, the user does not need to perform the operation of registering the network applications in the image forming apparatus 10. Furthermore, a network application of an absent user PC 20 can be excluded from the registered network applications. Therefore, needless network applications are prevented from being displayed among the execution candidates when the user is prompted to select a network application at the image forming apparatus 10.

The present invention is not limited to the specifically disclosed embodiment, and variations and modifications may be made without departing from the scope of the present invention.

The present application is based on Japanese Priority Patent Application No. 2009-057010, filed on Mar. 10, 2009, the entire contents of which are hereby incorporated herein by reference.

What is claimed is:

1. An image forming apparatus comprising:
an application information receiving unit configured to receive, from an information processing apparatus external to the image forming apparatus, an application information item list including a plurality of application information items, an application information item corresponds to an application or a job that is executed by the application, and to record the application information item in an application information storing unit, wherein the application information item includes a function identification information item used for identifying a function for which an execution request is given to the image forming apparatus from the application that is included in the information processing apparatus connected to the image forming apparatus via a network;
a display control unit configured to cause a display unit to display the application information item list including the application information item that corresponds to the application or the job, based on the application information item recorded in the application information storing unit; and
a function control unit configured to execute a process corresponding to the function identification information item included in the application information item that is selected from the application information item list.

2. The image forming apparatus according to claim 1, wherein
the application information receiving unit receives the application information item of a first type that corresponds to the job, wherein the application information item of the first type includes the function identification information item indicating a print function of the image forming apparatus; and
the display control unit causes the display unit to display the application information item list including the application information item of the first type that corresponds to the job.

3. The image forming apparatus according to claim 1, wherein
the application information receiving unit receives the application information item of a second type that corresponds to the application, wherein the application information item of the second type includes the function identification information item indicating a scan function of the image forming apparatus; and
the display control unit causes the display unit to display the application information item list including the application information item of the second type that corresponds to the application.

4. The information processing apparatus that is connected to the image forming apparatus according to claim 1 via the network, the information processing apparatus comprising:
an application information sending unit configured to send the application information item that corresponds to the application or the job that is executed by the application, wherein the application information item includes the function identification information item relevant to the application included in the information processing apparatus.

5. The image forming apparatus according to claim 1, wherein when the application information item list is sent, a URL that is unique to each of the application information items is generated.

6. An information processing method performed by an image forming apparatus, comprising:

receiving, from an information processing apparatus external to the image forming apparatus, an application information item list including a plurality of application information items, an application information item corresponds to an application or a job that is executed by the application, and recording the application information item in an application information storing unit, wherein the application information item includes a function identification information item used for identifying a function for which an execution request is given to the image forming apparatus from the application included in the information processing apparatus connected to the image forming apparatus via a network;

causing a display unit to display an application information item list including the application information item that corresponds to the application or the job, based on the application information item recorded in the application information storing unit; and executing a process corresponding to the function identification information item included in the application information item that is selected from the application information item list.

7. The information processing method according to claim 6, wherein the receiving step further includes a step of receiving the application information item of a first type that corresponds to the job, wherein the application information item of the first type includes the function identification information item indicating a print function of the image forming apparatus; and the causing step further includes a step of causing the display unit to display the application information item list including the application information item of the first type that corresponds to the job.

8. The image forming apparatus according to claim 6, wherein the receiving step further includes a step of receiving the application information item of a second type that corresponds to the application, wherein the application information item of the second type includes the function identification information item indicating a scan function of the image forming apparatus; and the causing step further includes a step of causing the display unit to display the application information item list including the application information item of the second type that corresponds to the application.

9. A non-transitory computer-readable recording medium recording a program that causes an image forming apparatus to execute a procedure comprising:

receiving, from an information processing apparatus external to the image forming apparatus, an application information item list including a plurality of application information items, an application information item corresponds to an application or a job that is executed by the application, and recording the application information item in an application information storing unit, wherein the application information item includes a function identification information item used for identifying a function for which an execution request is given to the image forming apparatus from the application that is included in the information processing apparatus connected to the image forming apparatus via a network;

causing a display unit to display the application information item list including the application information item that corresponds to the application or the job, based on the application information item recorded in the application information storing unit; and executing a process corresponding to the function identification information item included in the application information item that is selected from the application information item list.

* * * * *